US009833681B1

(12) United States Patent
Leitz

(10) Patent No.: US 9,833,681 B1
(45) Date of Patent: Dec. 5, 2017

(54) GOLF IMPACT PLANE MODEL

(76) Inventor: James Leitz, Slidell, LA (US)

( * ) Notice: Subject to any disclaimer, the term of this patent is extended or adjusted under 35 U.S.C. 154(b) by 825 days.

(21) Appl. No.: 13/589,846

(22) Filed: Aug. 20, 2012

Related U.S. Application Data

(60) Provisional application No. 61/525,083, filed on Aug. 18, 2011.

(51) Int. Cl.
*A63B 69/36* (2006.01)
*A63B 24/00* (2006.01)
*A63B 53/04* (2015.01)

(52) U.S. Cl.
CPC .......... *A63B 69/36* (2013.01); *A63B 24/0003* (2013.01); *A63B 2053/0441* (2013.01)

(58) Field of Classification Search
CPC ................ A63B 69/36; A63B 24/0003; A63B 2053/0441
USPC ....... 473/231, 238, 242, 236, 257–261, 243, 473/244, 314, 219, 223, 226, 233, 278; 434/252, 300, 211; 73/12.04, 12.09
See application file for complete search history.

(56) References Cited

U.S. PATENT DOCUMENTS

| 3,298,693 | A |   | 1/1967 | Eisenberg |  |
|---|---|---|---|---|---|
| 4,407,503 | A | * | 10/1983 | Nishizawa | 473/149 |
| 4,468,034 | A | * | 8/1984 | Duclos | 473/242 |
| 4,699,384 | A | * | 10/1987 | Bechler et al. | 473/264 |
| 5,139,263 | A |   | 8/1992 | Feo |  |
| 5,310,188 | A |   | 5/1994 | Hernberg |  |
| 5,439,225 | A | * | 8/1995 | Gvoich et al. | 473/223 |
| 5,658,204 | A | * | 8/1997 | Nappi | 473/229 |
| 5,836,829 | A |   | 11/1998 | Van Cott et al. |  |
| 6,500,075 | B1 |   | 12/2002 | Mcdevitt |  |
| 7,131,910 | B2 |   | 11/2006 | Townsend, II |  |
| 7,214,138 | B1 | * | 5/2007 | Stivers et al. | 473/199 |
| 7,427,238 | B1 |   | 9/2008 | Oprandi et al. |  |
| 7,670,233 | B2 | * | 3/2010 | Jones | 473/257 |
| 7,727,080 | B1 |   | 6/2010 | Fitzgerald |  |
| 7,857,708 | B2 |   | 12/2010 | Ueda et al. |  |
| 7,874,930 | B2 |   | 1/2011 | Hubley |  |

(Continued)

OTHER PUBLICATIONS

"New Ball Flight Rules, the D-Plane," (video) http://forums.iseekgolf.com/topic/36757-new-ball-flight-rules-the-d-plane, Jul. 8, 2010.*

(Continued)

*Primary Examiner* — Sam Yao
*Assistant Examiner* — Jennifer L Korb
(74) *Attorney, Agent, or Firm* — Garvey, Smith & Nehrbass, Patent Attorneys, L.L.C.; Seth M. Nehrbass; Julia M. FitzPatrick

(57) ABSTRACT

An apparatus for demonstrating how golf balls interact with golf clubs includes a downswing plane, a club shaft attached to the downswing plane, a golf club head attached to the club shaft, and a collision-plane indicator attached to the golf club head wherein the collision-plane indicator illustrates the plane created by two intersecting lines that are in the direction of the path and the direction of the club face. Preferably, the downswing plane has an adjustable angle, and preferably the downswing plane swivels. Preferably the club shaft is pivotally attached to the downswing plane. Preferably the apparatus includes a removable golf ball with a spin axis through the middle of the ball, and with a black line across the middle of the ball that indicates spin direction perpendicular to the ball's spin axis.

20 Claims, 14 Drawing Sheets

(56) References Cited

U.S. PATENT DOCUMENTS

| | | |
|---|---|---|
| 7,927,228 B2 | 4/2011 | Rhodes |
| 2012/0040769 A1* | 2/2012 | Swingle et al. ............. 473/195 |
| 2012/0178545 A1* | 7/2012 | Bowlby ........................ 473/229 |

OTHER PUBLICATIONS

Jorgensen, Theodore P., The Physics of Golf, Second Edition, 1999, pp. 86-89, Springer Science + Business Media, Inc., New York.

* cited by examiner

GOLF IMPACT PLANE MODEL

CROSS-REFERENCE TO RELATED APPLICATIONS

This is a non-provisional of U.S. Provisional Patent Application No. 61/525,083, filed 18 Aug. 2011, and incorporated herein by reference. Priority of U.S. Provisional Patent Application No. 61/525,083 is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to golf practice or training devices that assist a golfer in learning the proper swing angle in relation to the club path and golf ball. More particularly, the present invention relates to a Golf Impact Plane Model that illustrates the geometric possibilities of the collision between a golf club and a golf ball on an inclined plane. The plane formed by the direction of the center of gravity of the club head and the direction the club face points at impact is the plane that the golf ball will start on and the plane that the spin axis of the ball is perpendicular to.

2. General Background of the Invention

In the golf swing practice or training industry, golfers may use various training devices to help assist in learning the proper swing angle in relation to the club path and ball. The following U.S. Patents are incorporated herein by reference: U.S. Pat. Nos. 3,298,693; 5,139,263; 5,310,188; 5,836,829; 6,500,075; 7,131,910; 7,427,238; 7,727,080; 7,857,708; 7,874,930; and 7,927,228. Also incorporated herein by reference is *The Physics of GOLF*, Second Edition, by Theodore P. Jorgensen (and especially pages 86-89, which discuss the D plane: "The D plane for a golf swing contains the path along which the club head is moving at impact, the normal to the clubface, and the initial path of the ball after impact. The D plane also contains the aerodynamic lift force, since the lift force is perpendicular to the axis of spin and this axis is perpendicular to the D plane.").

BRIEF SUMMARY OF THE INVENTION

The apparatus of the present invention is a golf impact plane model which demonstrates how relationships change as a golf club moves on an inclined plane.

The Leitz Golf Impact Model of the present invention is a golf swing model to illustrate the possible geometrical relationships between the golf club, golf ball, and the target at impact. For a golfer to improve, or even his instructor to help him to improve, they must first understand why the ball flies the way it does. The impact geometry demonstrated with this model conforms to accepted physics collision models. So the errant shot a golfer hits is because his or her geometric impact relationships were not correct for the desired outcome.

So, without the proper understanding of golfs geometry and physics leads to an endless journey of misdiagnosis and improper adjustments. The four laws that create a certain ball flight are 1. Club head speed at impact. 2. Club path/angle of attack direction at impact. 3. Club face direction at impact. 4. Impact point of the ball on the face as it relates to the center of gravity of the club head. This model demonstrates the geometric side of laws #2 and #3. The relationship between the path direction and club face direction at impact determine the initial ball speed, also the initial launch direction of the ball in relation to the target and launch angle of the ball in relation to the horizon given a center of percussion impact point on the face of the club and a certain club head speed. Also they determine the amount of ball spin and the orientation of the ball spin axis of rotation in relation to the horizon which introduces the possibility of ball curvature. Euclid, the famous mathematician, stated that any two lines that intersect form a plane. The path/angle of attack direction is described as the tangential direction of the force of the club to the circle or arc it is traveling on at impact. The plane formed by the intersection of the path/angle of attack direction and the club face direction at impact form what is referred to as the D-plane by Dr. Theodore Jorgenson (The Physics of Golf 1994). The golf balls initial launch occurs on this plane. The spin axis is always perpendicular to the formed plane on a center of percussion impact point. The D-plane formation is always changing in size and orientation to itself and the target as the club approaches the ball traveling on its circle or arc on the inclined plane. The Leitz Impact Model demonstrates and allows for the adjustment of the club face to path/angle of attack relationships on the inclined plane and the downswing plane direction and angle.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

The following is a description of a prototype of the present invention:

Purpose of my invention: The illustration of the geometric possibilities of the collision between a golf club and a golf ball on an inclined plane. The plane formed by the direction of the center of gravity of the club head and the direction the club face points at impact is the plane that the golf ball will start on and the plane that the spin axis of the ball is perpendicular to.

My invention solves: The illustration by the model provides adjustability in the following alignments that will cover all the possible impact alignments that form the collision and ball flight plane that cause the golf ball to fly the way it does. The clubshaft rotates around a fixed point on an incline plane. The angle of the incline plane is adjustable. The direction of the base in relation to the target at the horizon is adjustable. The rotation of the clubface is adjustable, and its direction is determined by a rod indicator that is perpendicular to the clubface. There is a rod that indicates where the center of gravity (club path) is moving at any given time. It incorporates the vertical angle of attack and the horizontal path components together.

My invention:

1. Demonstrates the movements of a golf club on an inclined plane on the downswing portion of the swing and especially impact.

2. Demonstrates why a golf ball flies the way it does and how the two components of the collision model are created: #1 the direction of the motion of the club at any time on the downswing and particularly at impact; #2 the direction of where the club face is pointing at any time on the downswing and particularly at impact.

3. These impact components are determined based on the adjustability at impact of
   A. The clubface
   B. The angle of attack & path (i.e. the motion direction of the club at impact)
   C. The Angle of the downswing plane
   D. The downswing plane direction as it intersects the horizon 4. These two directional components are measured from the center of gravity of the clubhead. These two lines can be exactly in the same direction, or they can point in different directions. When they point in different directions the two lines intersect and create a plane. The plane that is formed is called the Ball Collision and Ball flight Plane, or Golf Collision Plane.

5. This formed plane determines:
   A. If the plane is vertical to the ground or has a tilted angle in relation to the ground
   B. The starting direction of the ball starts on this plane
   C. The lift direction of the ball is on this plane.
   D. The spin axis is perpendicular to this plane based on center faced hit
   E. The amount of backspin on the ball based on the spin loft angle at impact, clubhead speed, and impact point. The spin loft is created by the angle that is between the angle of attack and the clubface direction. Also the more the club head speed the more the backspin with the same spin loft.

Figure 1:
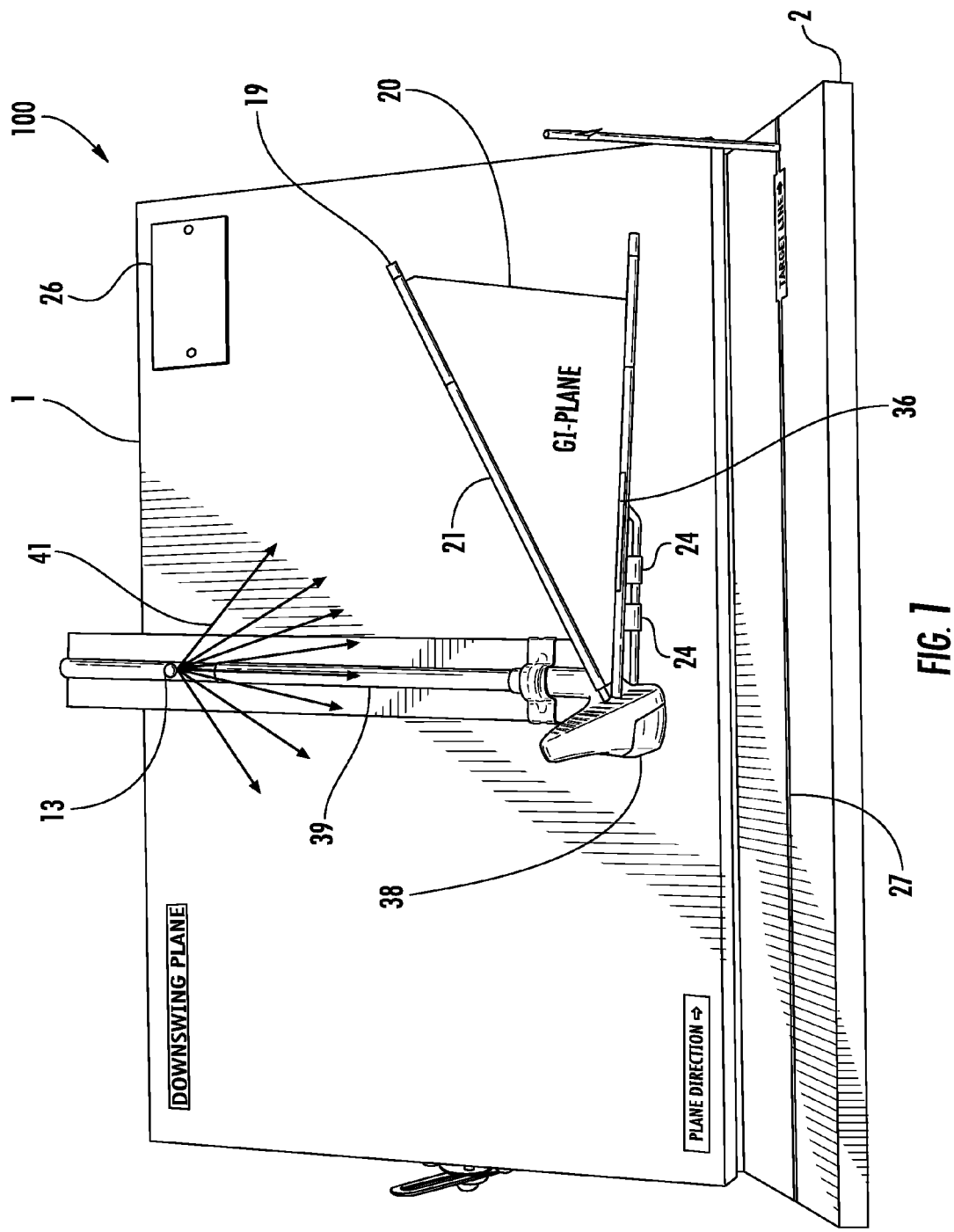
FIG. 1 is a perspective view showing the top of a preferred embodiment of the apparatus of the present invention.
Figure 2:
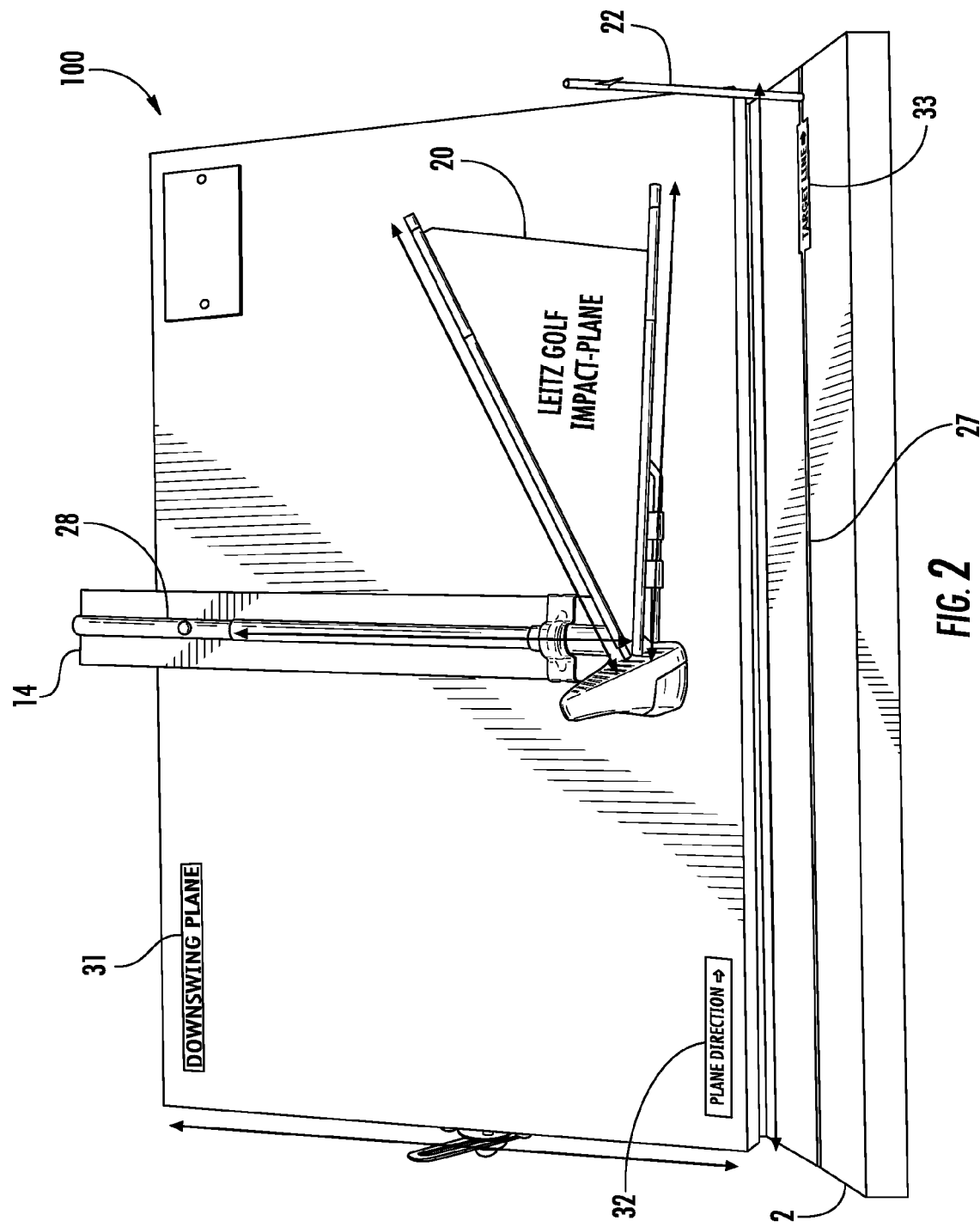
FIG. 2 is a perspective view showing the top of a preferred embodiment of the apparatus of the present invention.
Figure 3:
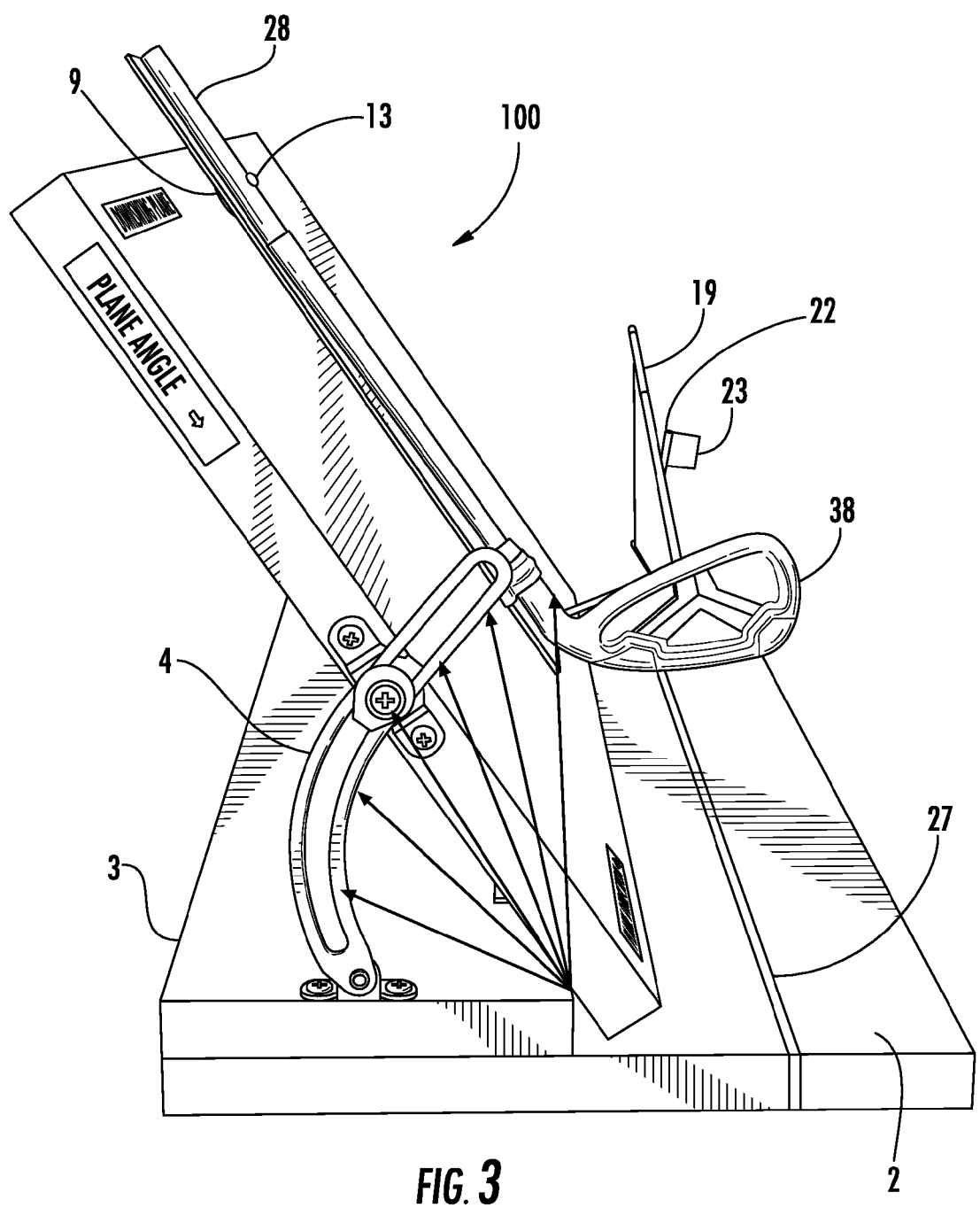
FIG. 3 is a side view of a preferred embodiment of the apparatus of the present invention.

FIGS. 1 and 2 show:
1. Clubshaft 0.370 O.D.-0.320 I.D.
2. Centered Clubshaft pivot point. Allows club to be rotated on the inclined plane
3. Hosel holder bracket. Allows clubface to be rotated freely in relation to the downswing plane, to show different clubface relationships during the downswing, but tight enough to hold its place.
4. Removable Face Direction Indicator Rod. Normal to the clubface at all times. Hole drilled perpendicular to the face of club. ⅛" Rod O.D.
5. Club Path & Angle of Attack Indicator Rod. Shows how the angle of attack is constantly changing during the downswing in relation to the horizon. Also, it indicates how the path is constantly changing in relationship to the downswing plane and target line. Swivels on pivot point attached to framing square. ⅛" O.D.
6. Collision-Plane indicator illustrates the plane created by the two intersecting lines that are the direction of the path and the direction of the clubface.
7. Flagstick on Target Line. 4 inches tall.
8. Downswing Plane 17½"×12"×¾". This plane is adjustable for its angle and swivels on a pin, on top of the base, to change the Planes base direction.
9. Base that depicts the ground, the target line, and the flagstick. 17½"×10"×¾". Painted Valspar Spray Pea-cock House Green #65034 from Lowes FIG. 3 shows:
1. Adjustable Desk Hinge. Adjusts plane angle from 90 degrees vertical to the base, down to 20 degrees.
2. Target Line. ⅛" pin striping tape
3. 12"×4" Framers Square with pivot hole drilled 1" from the top of the Plane
4. 0.370 shaft tapered to fit inside a 0.370 O.D. golf shaft with a 0.320 I.D. The golf shaft should be able to rotate inside freely.
5. Golf club head attached to shaft. Any lofted club will demonstrate D-plane relationships. A 33 degree 7 iron is used here.

Figure 4:
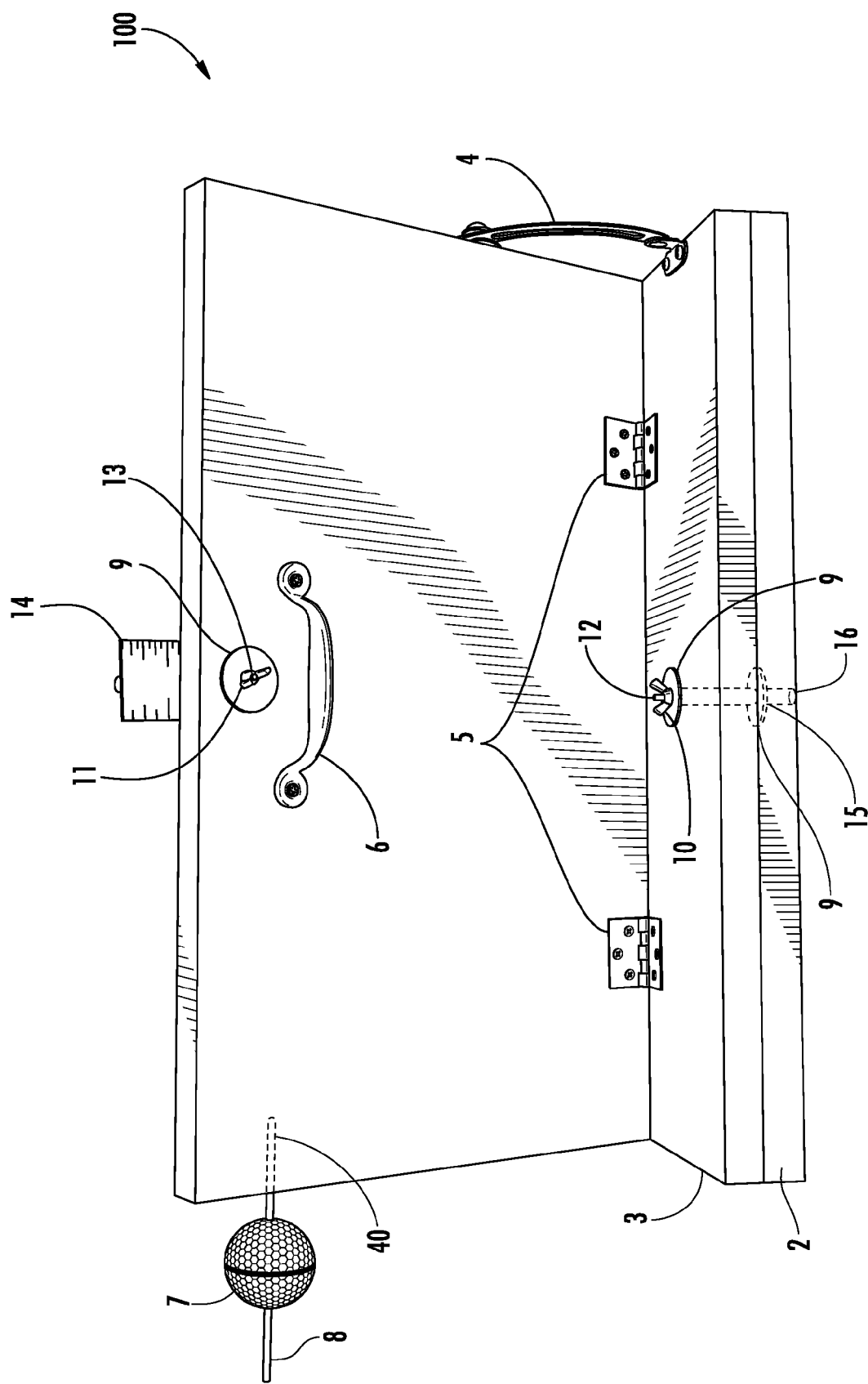
FIG. 4 is a front view of a preferred embodiment of the apparatus of the present invention.

FIG. 4 shows:
1. Removable Golf Ball with spin axis through middle of ball. Black line showing the spin direction perpendicular to spin axis.
2. Two Hinges attached to base and inclined downswing plane. 1½×2 inch hinges. Two inches from edges of plane.
3. 4¾" door handle to pick up model
4. #6, 1½" long bolt with flathead on one end and threads on the other. Bolt goes through Tapered Shaft, then framing square, then insert fender washer, then through downswing plane board, then fender washer, then a wing nut to tighten. Hole drilled through downswing plane that is centered and 1" from top.
5. #8, 2" bolt that is put through the bottom of base, then a fender washer, then through the downswing plane base, then another fender washer, then a wing nut to tighten. This allows the swing plane to pivot in relation to the target line. Hole is centered and 3" from back of model.
6. Downswing plane base is 5"×17.5"×¾'thick. Hole for pivot bolt is centered and is 3 inches from the back of the model.
Painted Valspar Spray Hubbell House golden maize #65203 from Lowes.

Figure 5:
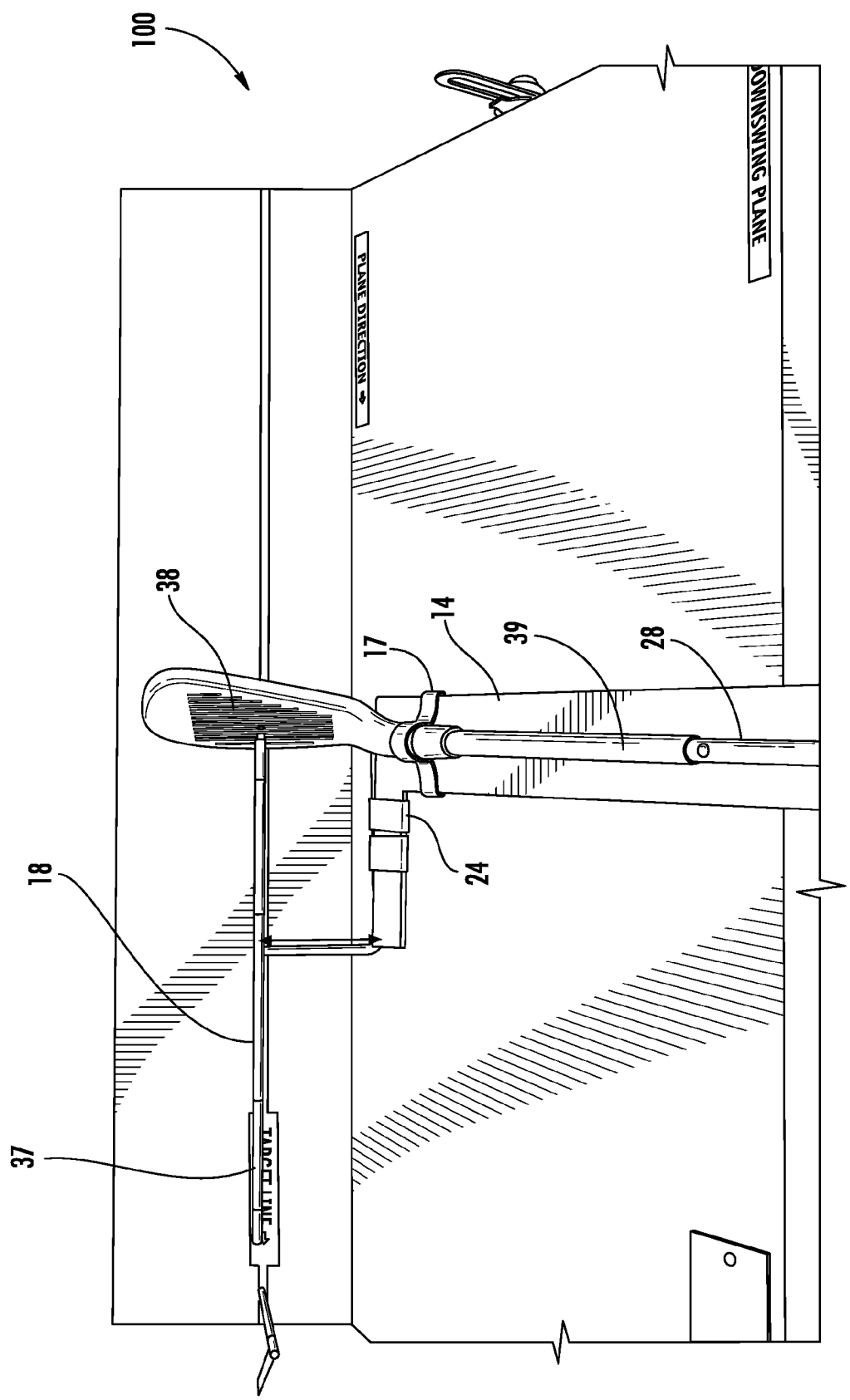
FIG. 5 a fragmentary view of the top of a preferred embodiment of the apparatus of the present invention.

FIG. 5 shows:
1. Club Path/Angle of attack Indicator. H shaped wire Attached to slide and rotate on the bottom of the framers square by using flat bar to attach it. This allows it to always be parallel to the inclined plane and to touch the center of the face. This illustrates the path of the club on the inclined plane as it moves.

2. Brackets that clamp the path/angle of attack indicator to the L shaped framing square. They allow the Path/Angle of attack indicator to slide and rotate.

3. Hole drilled perpendicular to the face of the club to hold the clubface directional rod.

Figure 6:
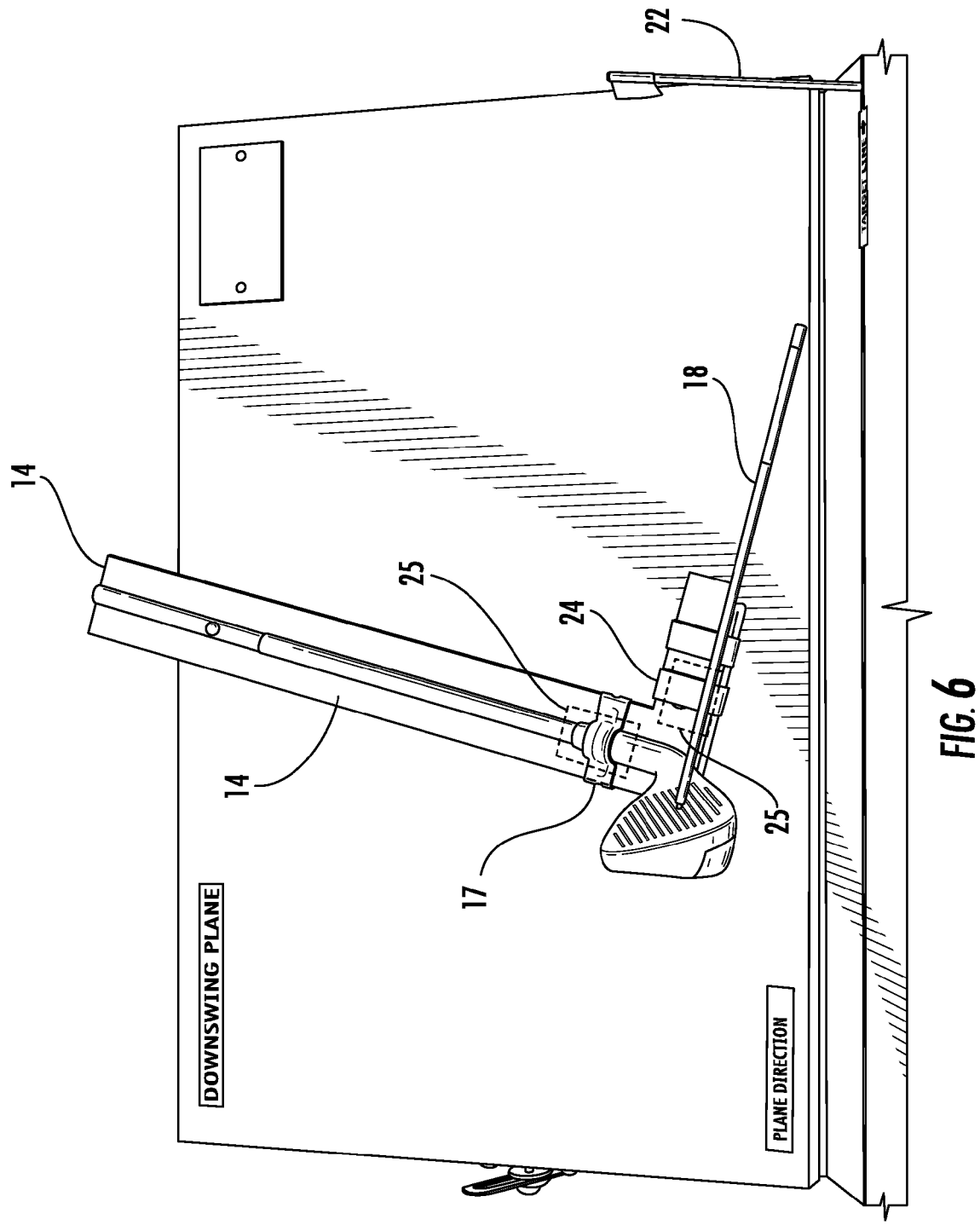
FIG. 6 a fragmentary view of the top of a preferred embodiment of the apparatus of the present invention.

FIG. 6 illustrates that the angle of attack constantly changes on the inclined plane.

Figure 7:
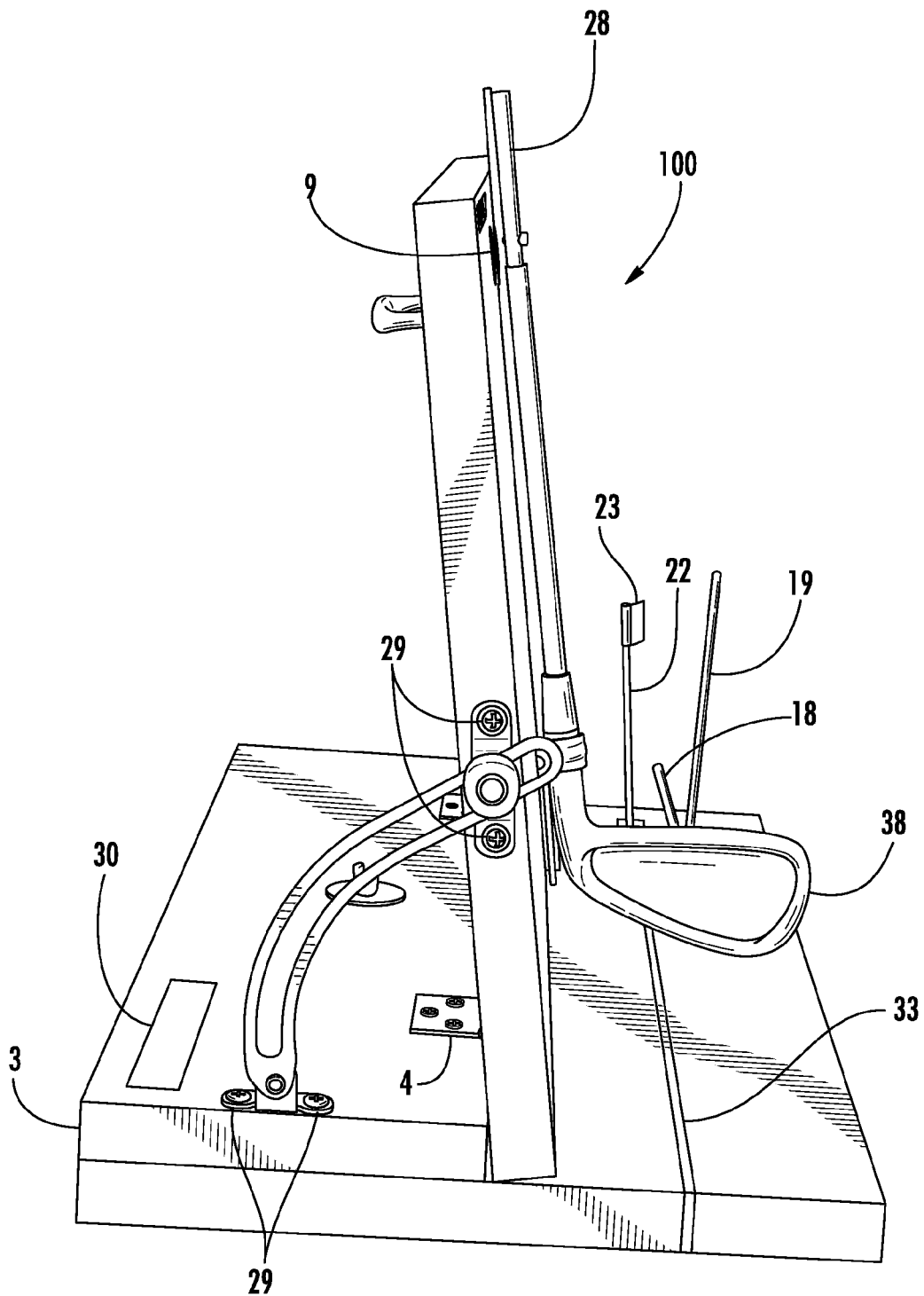
FIG. 7 a side view of a preferred embodiment of the apparatus of the present invention.

FIG. 7 illustrates that with a steeper plane angle, the angle of attack affects the path less.

Figure 8:
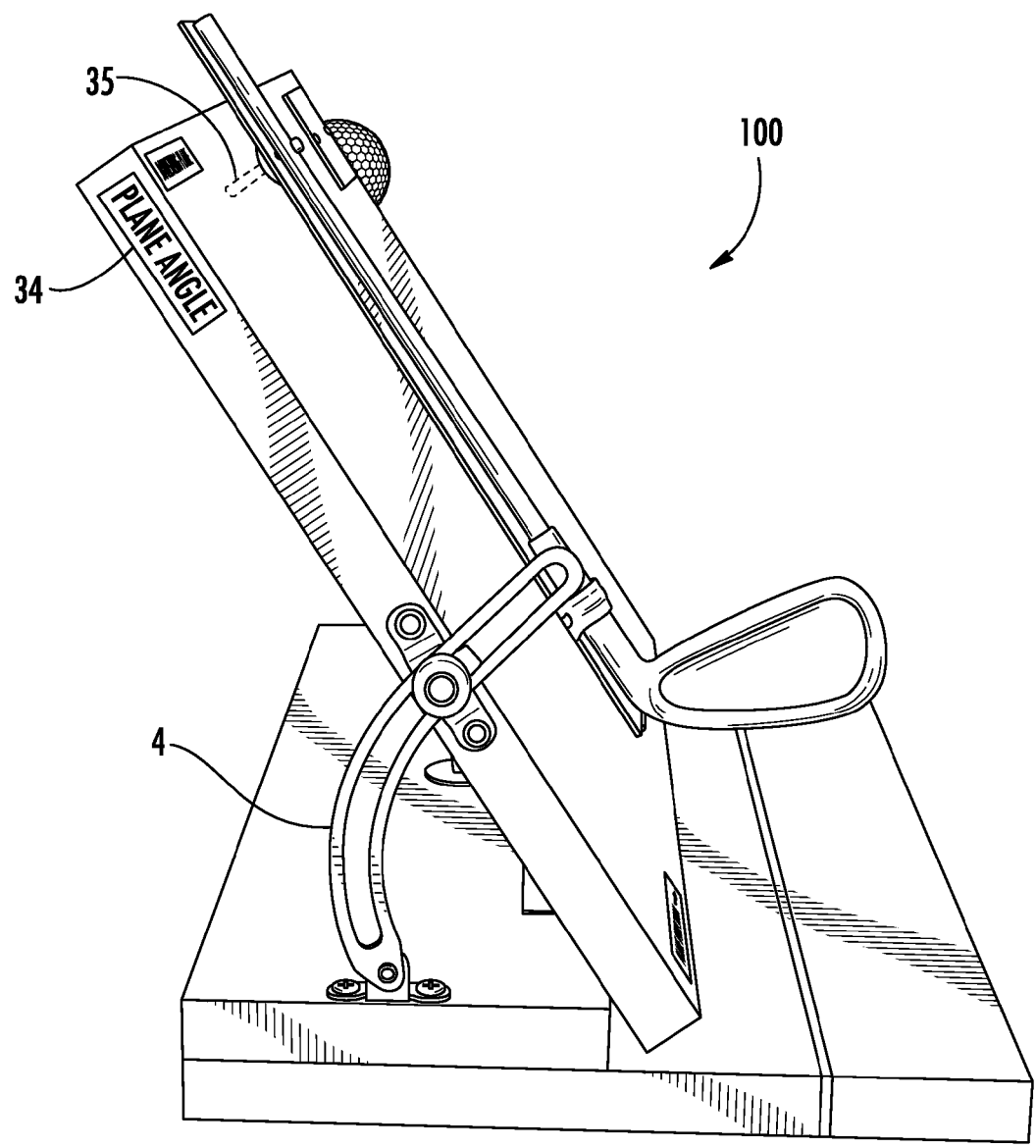
FIG. 8 is a side view of a preferred embodiment of the apparatus of the present invention.

FIG. 8 illustrates that the flatter the plane angle the more the angle of attack affects the path.

Figure 9:
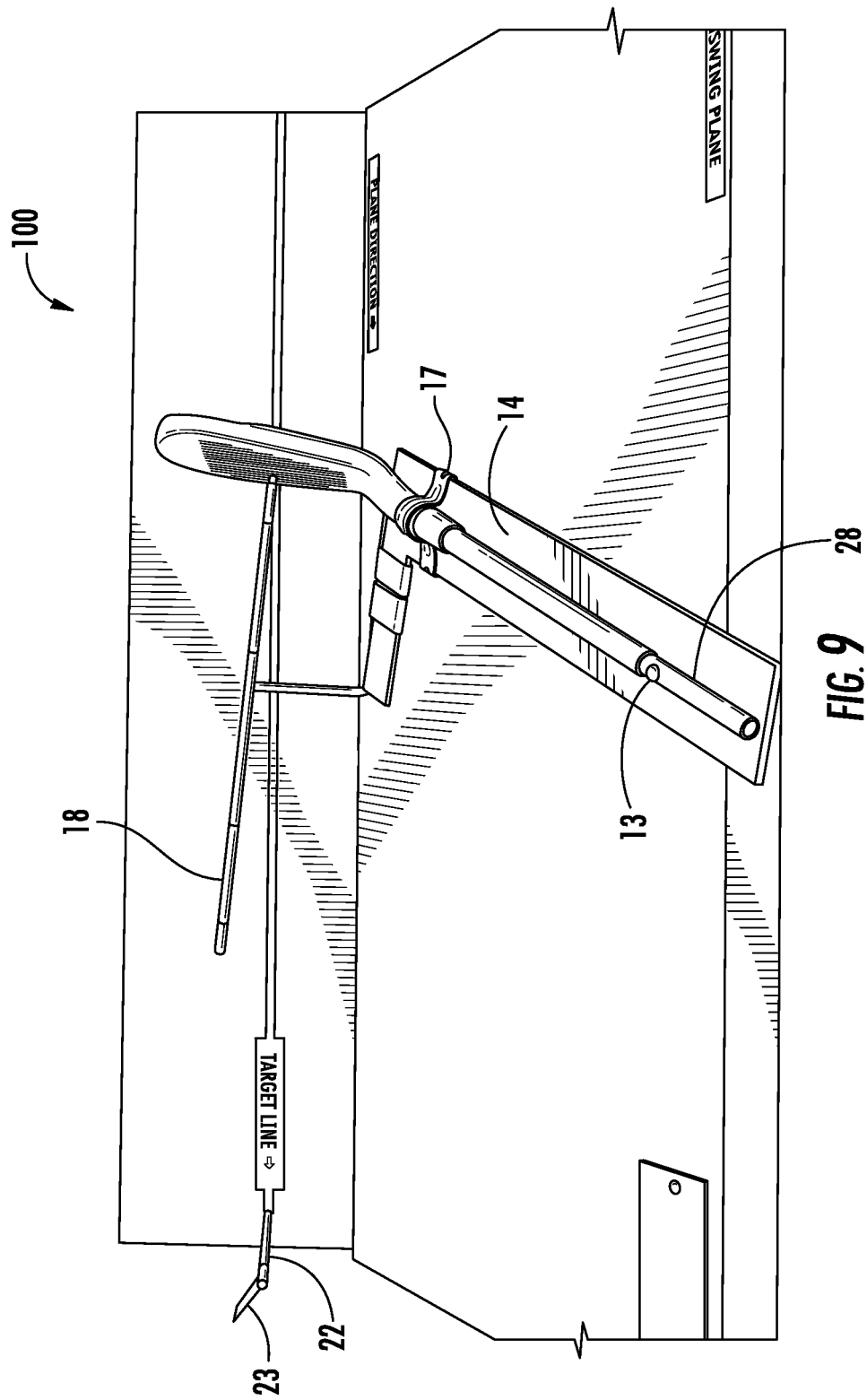
FIG. 9 is a downward view of a preferred embodiment of the apparatus of the present invention.

FIG. 9 shows that a downward angle of attack with a straight away plane direction creates an inside out path.

Figure 10:
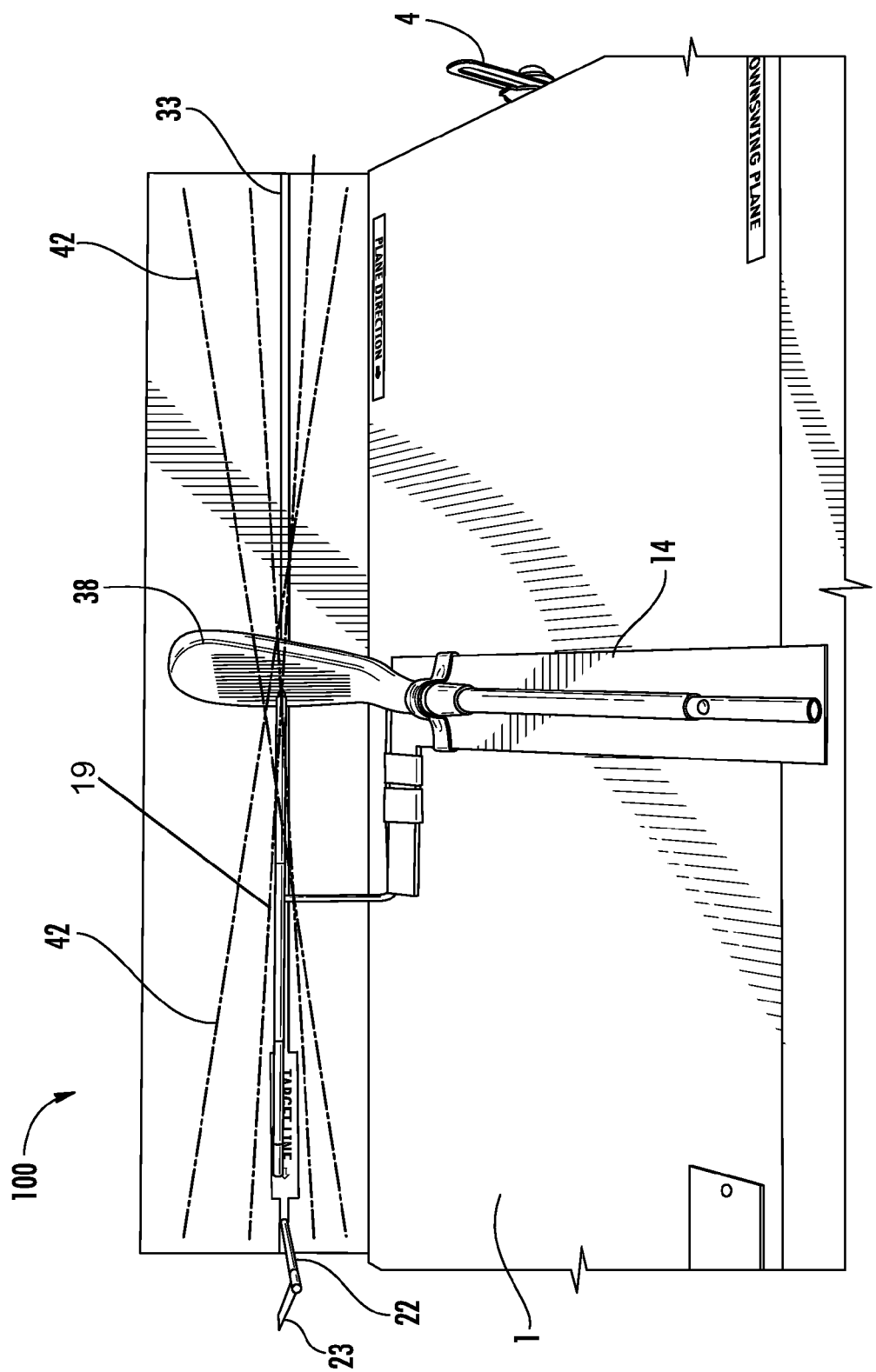
FIG. 10 is a downward view of a preferred embodiment of the apparatus of the present invention.

FIG. 10 illustrates that a bottom of the arc angle of attack with a straight away plane direction creates a straight path.

Figure 11:
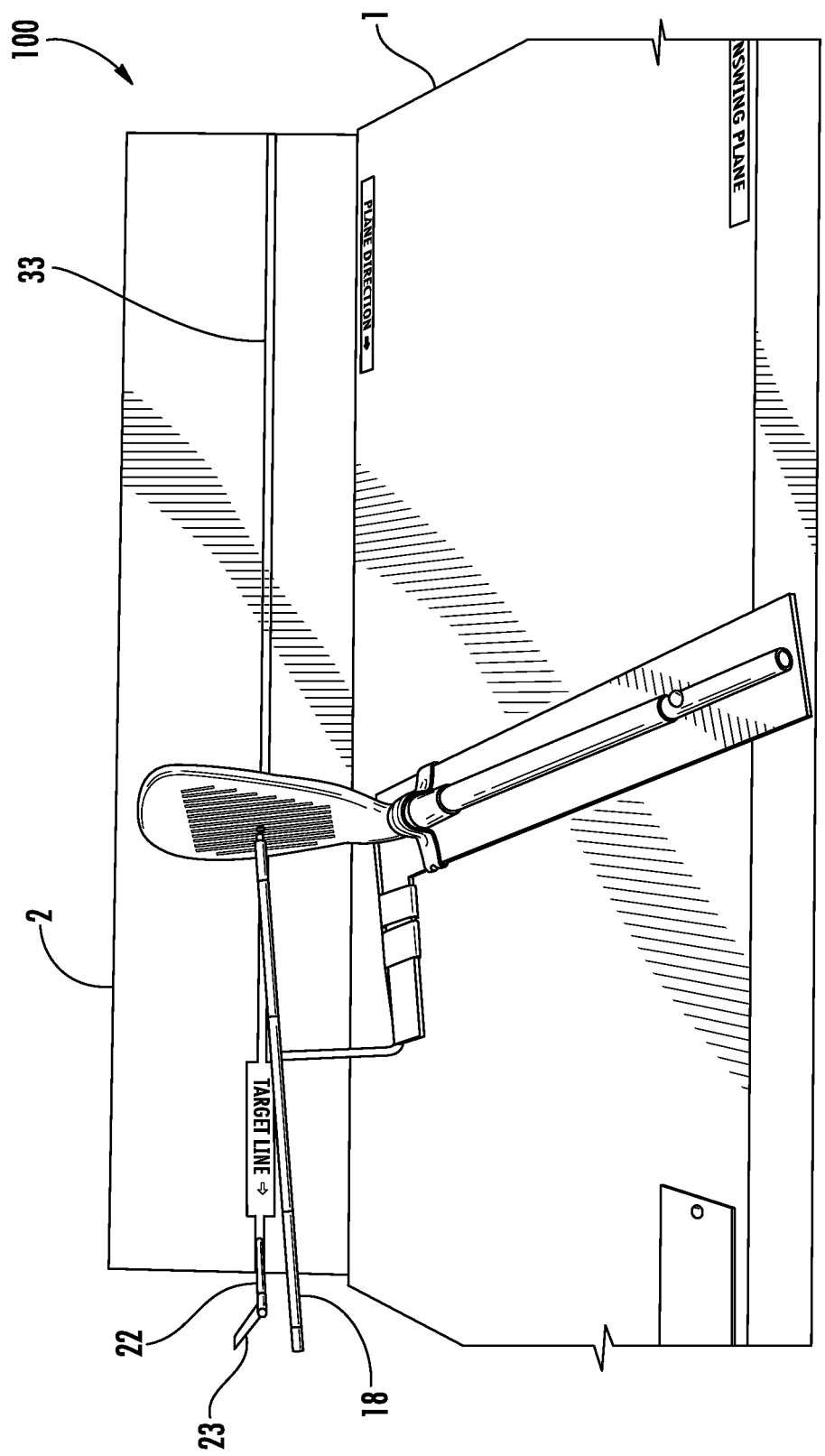
FIG. 11 is a downward view of a preferred embodiment of the apparatus of the present invention.

FIG. 11 shows that an upward angle of attack with a straight away plane direction creates an outside-in path.

Figure 12:
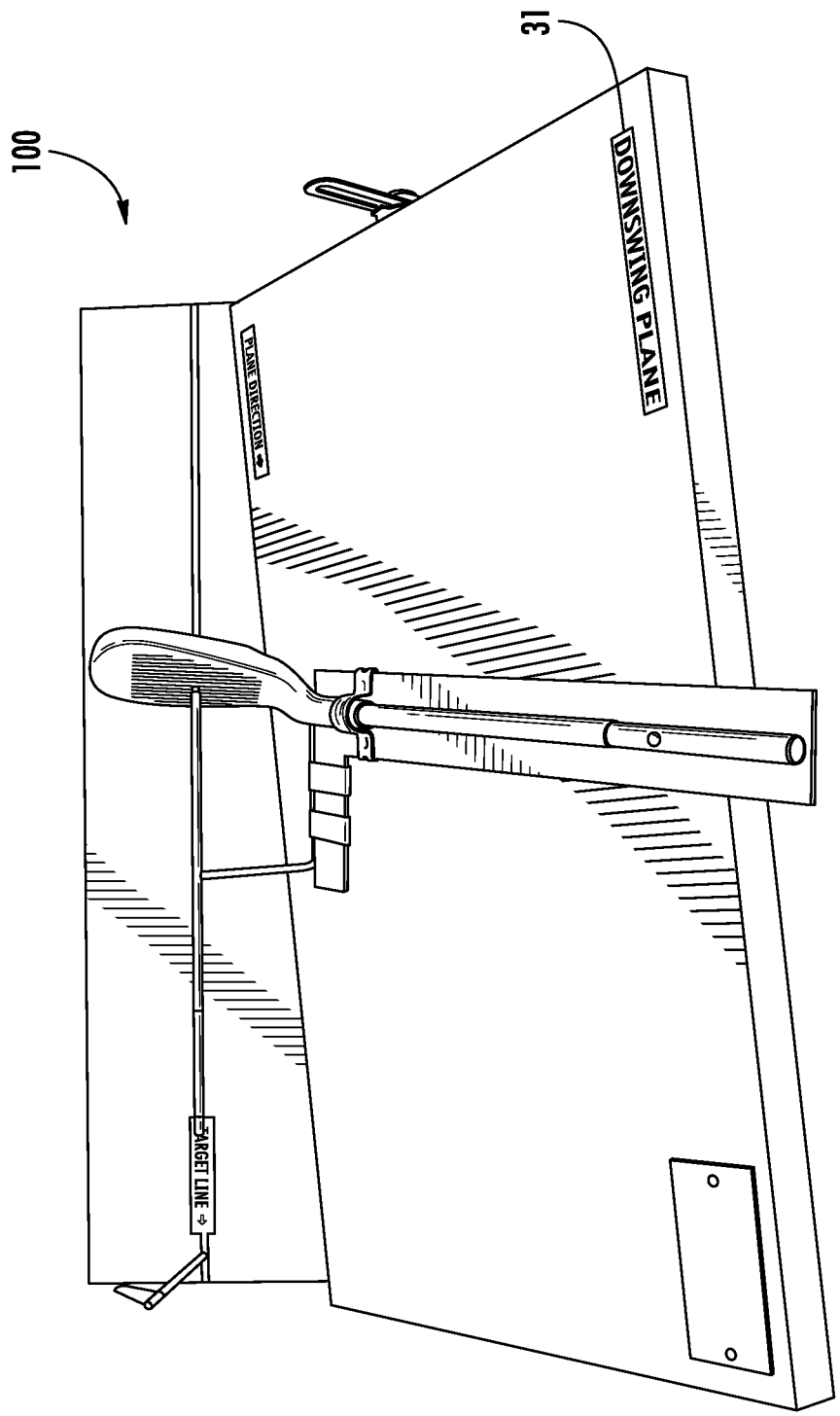
FIG. 12 is a perspective view of a preferred embodiment of the apparatus of the present invention.

FIG. 12 illustrates hitting down on the ball with left of target plane direction but straight away path.

Figure 13:
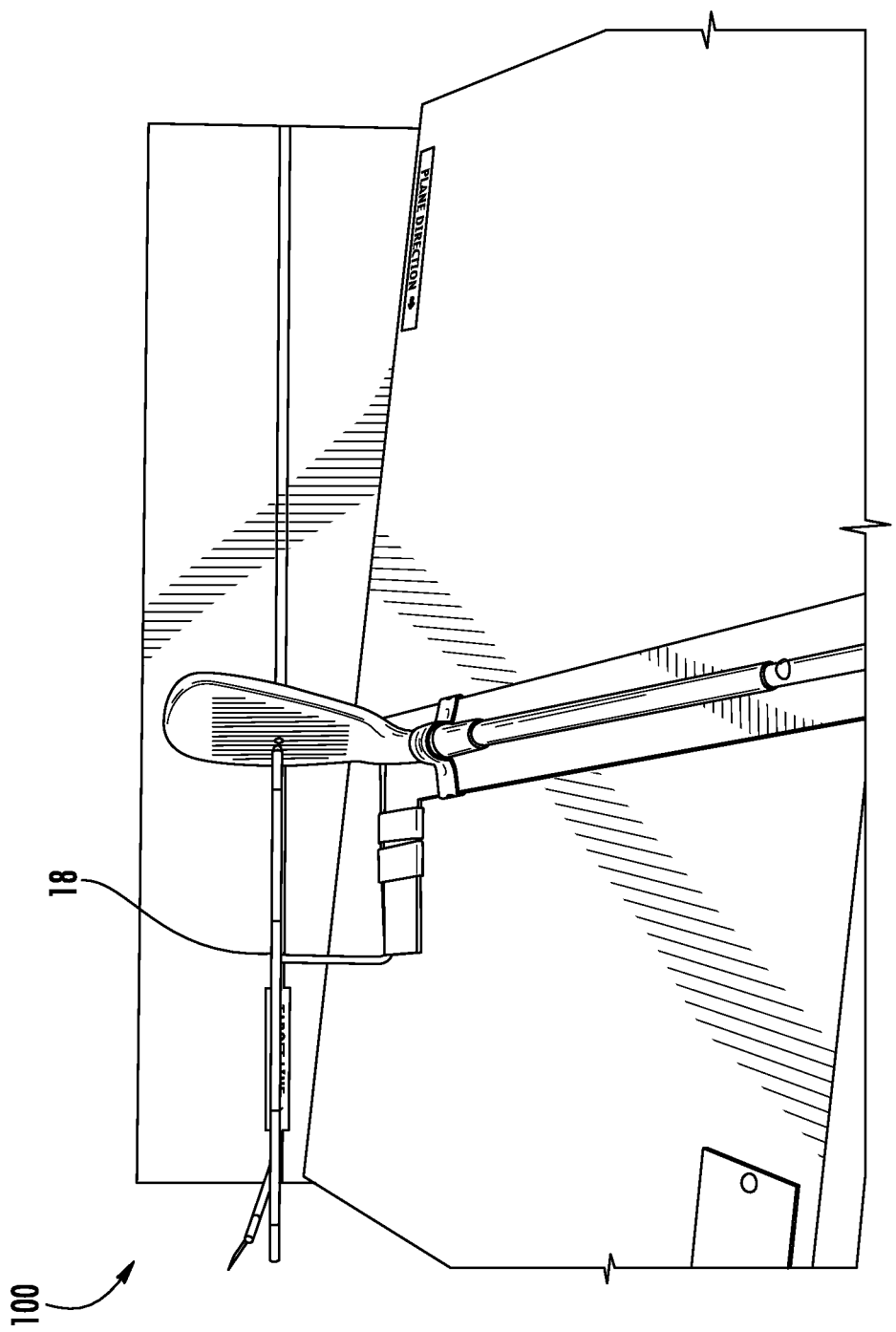
FIG. 13 is a fragmentary view of a side of a preferred embodiment of the apparatus of the present invention.

FIG. 13 illustrates hitting up on the ball with right of target plane direction but straight away path.

Figure 14:
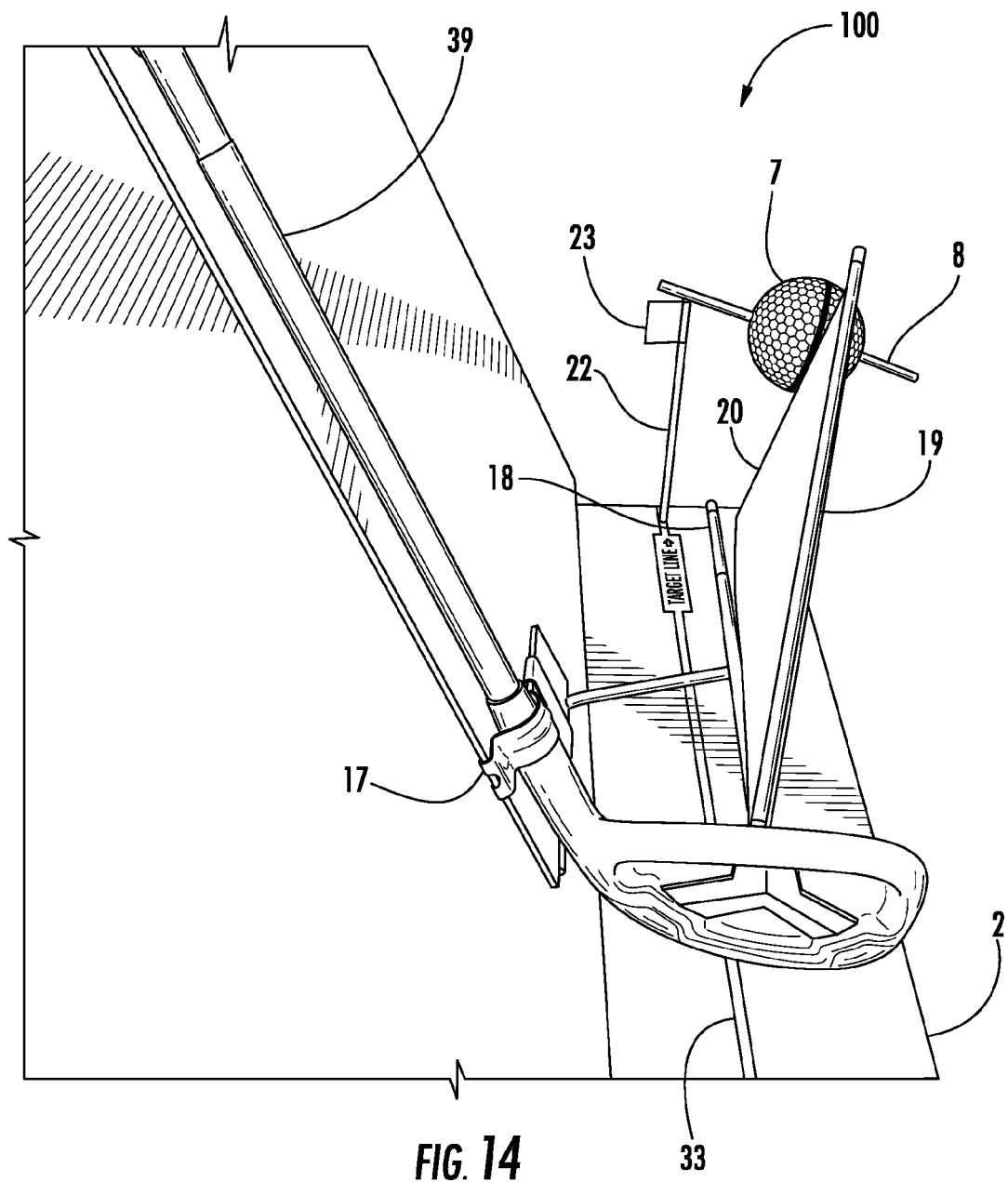
FIG. 14 is a fragmentary view of a side of a preferred embodiment of the apparatus of the present invention.

FIG. 14 illustrates that a club face direction open to path direction creates a tilted collision plane and a tilted spin axis to the right which creates a fade or slice. The opposite creates a draw or hook.

One could add to the downswing plane an indication of degrees of angle of the club shaft from vertical. One could also add to the adjustable desk hinge an indication of degrees of angle of the downswing plane from horizontal. One could also add to the green ground base numbers indicating the number of degrees from parallel to the target line that the base of the downswing plane is oriented.

Dimensions of components of the present invention can be for example in the ranges specified below:

downswing plane 1,—preferably 8-68 inches long by 6-48 inches wide by ¼ inch-1 inch thick, for example 17½ inches long by 12 inches wide by ¾ inch thick;

Downswing Plane Base 3,—preferably 8-68 inches long by 3-20 inches wide by ¼ inch-1 inch thick, for example 17½ inches long by 5 inches wide by ¾ inch thick;

Horizon Plane Base 2,—preferably 8-68 inches long by 4.5-36 inches wide by 0.25-1 inch thick, for example 17½ inches long by 9 inches wide by ¾ inch thick;

Golf Clubshaft 38,—preferably 4.5-36 inches long by 0.200-0.400" diameter, for example 9 inches long by 0.370" diameter;

Golf Club 38,—preferably 0-64 degrees loft, 30-90 degree lie angle, for example 32 degrees loft, 62 degree lie angle.

| FIG. | PART # | QTY. | Parts list with Exemplary Dimensions |
|---|---|---|---|
| 1 | 1 | 1 | Downswing plane MDF wood, painted yellow, 2 coats (17½" × 12" × ¾") |
| 1 | 2 | 6 | Horizon plane base MDF wood, painted hunter green, 2 coats (17½" × 9" × ¾") |
| 3 | 3 | 1 | Downswing plane base MDF wood, painted yellow 2 coats (17½ × 5 × ¾) |
| 3 | 4 | 1 | Downswing plane angle support hinge #0311954 (1½" from back of base, 3/32 pilot hole) |
| 4 | 5 | 2 | Downswing plane hinge (311954) connecting downswing plane with base (2 inches from each end drill 5/64 pilot holes) |
| 4 | 6 | 1 | Handle (4¾" door handle centered and mounted 2" down from top with 5/64" pilot hole) |
| 4 | 7 | 1 | Golf ball, U.S.G.A. regulation golf ball, black line drawn around he golf ball around the equator |
| 4 | 8 | 1 | Golf ball spin axis 4" × .145" diameter, inserted through the center of the golf ball |
| 4 | 9 | 4 | Fender washer, 1¼" diameter, 1/16" thick, with ¼" hole drilled through the center |
| 4 | 10 | 1 | Wing nut #8 size |
| 4 | 11 | 1 | Wing nut #6 size |
| 4 | 12 | 1 | Plane pivot bolt #8/32 × 2", head of bolt inserts from the bottom of the horizon plane base, counter sunk head in wood. |
| 1 | 13 | 1 | Golf club pivot bolt, #6-32 × 1½" Bolt inserted through shaft extension pivot & downswing plane, washer to attach club |
| 6 | 14 | 1 | Pendulum golf club holder 12" × 1½" × ⅛" at top and 1" × 2½" at bottom |
| 4 | 15 | 1 | 3/16" hole drilled through the downswing plane base and the horizon plane base, in center and 2" from rear of model |
| 4 | 16 | 1 | Countersink horizon plane base with ½" diameter × ¼" depth |
| 6 | 17 | 1 | Hosel pivot sleeve, ⅝" × 4" × 3/64" wrapped around hosel to fit snugly to size and to wrap around pendulum golf club holder |
| 9 | 18 | 1 | Path/angle of attack indicator, 2¾" × 1¾" × 5", ⅛" diameter wire red |
| 1 | 19 | 1 | Clubface direction indicator, 6" × ⅛" diameter wire, red |
| 1 | 20 | 1 | Golf impact plane indicator 5" × 2½" hypotenuse triangle mounted on straw |
| 1 | 21 | 1 | Golf impact plane indicator mounting tube, 5/16" diameter tube × 5½", |
| 7 | 22 | 1 | Flagstick 2½" × ⅛" diameter |
| 7 | 23 | 1 | Flag ¾" × ¾" red |
| 6 | 24 | 1 | Path/angle of attack indicator holder, 2⅛" × ⅝" × 3/64" wrapped around |

-continued

| FIG. | PART # | QTY. | Parts list with Exemplary Dimensions |
|---|---|---|---|
| 6 | 25 | 2 | Velcro strips 3/4" × 3/4" squares to allow pendulum golf club holder to slide on downswing plane |
| 1 | 26 | 1 | Identification plate 3" × 2½" |
| 3 | 27 | 1 | Target line, ¼" line mounted 1⅜" from edge of horizon plane |
| 2 | 28 | 1 | Shaft pivot, 2" × 5/16" diameter, to fit inside of club shaft and allows the shaft to pivot freely, drill 9/64" hole for golf club pivot bolt |
| 7 | 29 | 4 | ½" wood screw |
| 7 | 30 | 1 | Model Decal - Leitz Golf Impact Model- Patent Pending - LEITZGOLF.COM - 985-643-6893 - Degree of club lie - Example 62 degrees |
| 2 | 31 | 1 | Downswing plane decal |
| 2 | 32 | 1 | Plane direction decal |
| 2 | 33 | 1 | Target line decal |
| 8 | 34 | 1 | Plane angle decal, staple in |
| 8 | 35 | 1 | Hole 9/64" drilled through downswing plane in center - 1" down from top |
| 1 | 36 | 1 | Angle of attack deal on indicator, mount letters on face side of indicator |
| 5 | 37 | 1 | Clubhead path decal on club path/angle of attack indicator, mount letters on top side of indicator |
| 1 | 38 | 1 | Gold club with 32 degrees of loft, drill 9/64" hold in center of face, perpendicular to face |
| 1 | 39 | 1 | Golf club shaft, .370 shaft with parallel tip 9" from bottom of heel to top of shaft |
| 4 | 40 | 1 | Golf ball holder, (9/32" × 2") drilled in side of downswing plane |
| 1 | 41 | | Arrows originating from the golf club pivot bolt 13 designate the measured degrees the club is different from vertical |
| 10 | 42 | | Possible face angles |
| 1 | 100 | | Model of the present invention |

Assembly of a working model 100 of the present invention can be as follows with exemplary colors and exemplary dimensions indicated in inches:

Cut downswing plane MDF (17½×12×¾);
Cut plane base MDF (17½×9×¾);
Cut ground MDF (17½×5×¾);
Paint downswing plane, yellow, 2 coats (17½×12×¾);
Paint plane base MDF, yellow, 2 coats (17½×10×¾);
Paint ground MDF, green, 2 coats (17½×5×¾);
Install two hinges (311954) connecting downswing plane with base, 2 inches from each end, drill 5/64 pilot holes;
Install plane angle support hinge #0311954, 1½" from back of base, 3/32 pilot hole;
Drill 3/16" hole through plane base and ground with corners square for plane swivel bolt;
Drill countersink in bottom of ground MDF to hide screw head;
Install bolt through ground base and plane base with fender washer in between and a washer on top of plane base, add 8/32 wing nut;
Install 4¾" door handle centered and mounted 2" down from top with 5/64" pilot hole;
Drill 3/16" hole through downswing plane 1 inch from top centered;
Cut framing square to 2½" on bottom;
Drill 5/32" hole 2½" down centered in square;
Mount ¾" pipe tie down wrapped around path/angle of attack indicator (pipe tie down should be 2⅛" long);
Mount ¾" pipe tie down wrapped around hosel (be sure hosel is secure and centered);
Cut shaft ½" below pivot hole;
Cut galvanized bolt to 2";
Grind galvanized bolt to fit inside of shaft snugly;
Drill 9/64" hole through galvanized bolt ½" from top;
Mount square with 1½" bolt through downswing plane with a washer separating the framing square and downswing plane and in between wing nut;
Stick two 1" Velcro squares on back of framing square to stop from scratching downswing plane;
Cut 7"×5" T-shaped path indicator (use ⅛" wire);
Drill 9/64" hole in center of the face of the club perpendicular to the face in every direction;
Cut 7½" Face indicator and grind to a taper to fit in hole in face;
Measure lie of club and write down on base of model under where the Leitz Golf Model Sticker will be;
Bend to fit T-shaped path/angle of attack indicator to center of the face and parallel to plane;
Red Tape face indicator;
Red Tape angle of attack indicator;
Drill 5/32" hole through center of golf ball with lines on equator;
Insert 5/32"×4" rod through the axis of ball;
Draw black line with fine line sharpie around ball with stencil;
Drill 5/32" hole in downswing plane on target side 2" from top to hole golf ball axis stick;
Zero out model to plane angle same as lie of club;
Zero out plane direction, square clubface, and vertical D-Plane;
Put ¼" white tape on target line (be sure tape is parallel to edge of green base horizon board);
Put target line decal over target line tape on target side;
Drill 5/16" hole in target line for flagstick (flagstick is 2½" long with ½" red tape as flags);
Install Downswing Plane Decal;
Install Plane Direction Decal;
Install Plane Angle Decal—Staple;
Install Leitz Golf Label with address and model angle number on plane base;
Install Path decal on indicator;
Install Angle of Attack Decal on indicator;
Install Clubface Decal on indicator;

Install Brass Plate that has model number on top right of downswing plane.

FIG. 1 shows the model 100 of the present invention. FIG. 1 is a face-on view of a golf club 38, attached to a downswing plane 1, by a golf club pivot bolt 13. It can have a slotted pivot bolt hole to allow the pivot bolt 13 to slide side to side and up and down or it can be as illustrated in the drawings in a fixed location. The downswing plane 1 is allowed to pivot on top of the horizontal plane base 2. The arrows 41 originating from the golf club pivot bolt 13 designate the measured degrees the club is different from vertical. The identification plate 26 is shown mounted on the downswing plane 1.

FIG. 2 is another perspective view similar to FIG. 1

FIG. 3 is a down-the-line view of the model 100 of the present invention. It shows the plane base 3, on top of the horizontal plane base 2. It shows how the downswing plane angle support hinge 4 is mounted. One can then see the target line 27, the flagstick 22, and the flag 23.

FIG. 4 is a rear view which shows the plane pivot bolt 12, which goes through the horizontal plane base 2, and the downswing plane base 3. Also shown are downswing plane hinges 5, which connect the downswing plane 1 with the downswing plane base 3, and allows the downswing plane base 3, and the downswing plane 1, to pivot relative to one another. The lifting handle 6 is also shown. One can see the golf club pivot bolt 13, from the rear view. One can also see the golf ball pivot axis 8, inserted into hole 40 in the downswing plane 1, for storage.

FIG. 5 is a top view of the model 100 of the present invention where one can see the path/angle of attack indicator 18, inserted in the path/angle of attack holder 24. The perpendicular hole in the face of the club face that the clubface indicator 38, is shown. The hosel pivot sleeve 17, is shown wrapped around the hosel and the pendulum golf club holder 14. One can see the shaft pivot shaft 28, inserted inside the club shaft 39.

FIG. 6 shows the path/angle of attack indicator 18, by itself without the clubface indicator 19. The pendulum golf club holder 14 is shown mounted on the downswing plane 1. The square felt pads 25 are shown in dotted lines that are mounted behind the pendulum golf club holder 14. The square felt pads 25 allow the pendulum golf club holder 14 to glide on the downswing plane 1.

FIG. 7 is another down-the-line view with the fender washer 9 mounted on the golf club pivot bolt 13, in between the downswing plane 1, and the shaft pivot 28. This also shows the mounting of the downswing plane angle support hinge 4. Also shown is the model decal 30 which includes contact information and the model's set lie angle.

FIG. 8 is a down-the-line view with the plane angle decal 34 on plane 1. Also shown is the for example %4" hole 35 drilled through the downswing plane 1 for the golf club pivot bolt 13.

FIG. 9 is a top view of a downswing where the angle of attack is down. It demonstrates that the path/angle of attack indicator 18, is pointing to the right of the flagstick 22, if the club is moving down at impact. Also it shows the path/angle of attack indicator 18, by itself with no club face direction indicator 19.

FIG. 10 shows the club face direction indicator 19, by itself with possible face angles 42 that are inscribed on the model 100.

FIG. 11 is a top view of the club moving on the upswing which shows the club path/angle of attack indicator 18, aiming to the left of the flagstick 22, at impact.

FIG. 12 is a top view with the plane direction pointing to the left just enough to cancel out the path of the club to the right when it is on a descending blow.

FIG. 13 is a top view with the plane direction pointing to the right just enough to cancel out the path of the club to the left on an ascending impact.

FIG. 14 is a close-up of the down-the-line view with the path/angle of attack indicator 18, pointing down the target line and the club face direction indicator 19, aiming to the right of the flagstick 22. This tilts the golf impact plane indicator 20, which is the D-Plane to the right which tilts the golf ball spin axis 8, to the right which causes a ball 7 to curve to the right. If the golf impact plane indicator 20, the D-Plane, is vertical then the golf ball spin axis 8 is parallel to the horizontal plane base 2, and the ball 7 will fly without curvature. This is what happens when the ball goes straight to the hole or is a straight push to the right or a straight pull to the left.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. Apparatus for demonstrating how golf balls interact with golf clubs, comprising:
    a downswing plane;
    a club shaft attached to the downswing plane and having a path when moved in a direction;
    a golf club head attached to the club shaft and having a club face; and
    a collision-plane indicator attached to the golf club head wherein the collision-plane indicator illustrates a plane created by two intersecting lines that are in the direction of the club path and the direction of the club face.

2. The apparatus of claim 1 wherein the downswing plane has an adjustable angle.

3. The apparatus of claim 2 wherein the downswing plane swivels.

4. The apparatus of claim 1 wherein the club shaft is pivotally attached to the downswing plane.

5. The apparatus of claim 1 wherein the club shaft can rotate about its longitudinal axis to adjust or demonstrate club face orientation.

6. The apparatus of claim 1 further comprising a removable golf ball with a spin axis through the middle of the ball, and wherein a black line across the middle of the ball indicates spin direction perpendicular to the spin axis of the ball.

7. The apparatus of claim 1 further comprising a target.

8. The apparatus of claim 7 wherein the target is a flag.

9. The apparatus of claim 7 wherein the target is on a base.

10. The apparatus of claim 9, wherein the base has a target line.

11. Apparatus for demonstrating how golf balls interact with golf clubs, comprising:
    a downswing plane;
    a club shaft attached to the downswing plane and having a path when moved in a direction;
    a golf club head attached to the club shaft and having a club face;
    a collision-plane indicator attached to the golf club head wherein the collision-plane indicator illustrates a plane created by two intersecting lines that are in the direction of the club path and the direction of the club face; and
    a base having a target thereon.

12. The apparatus of claim 11 wherein the downswing plane has an adjustable angle.

13. The apparatus of claim 12 wherein the downswing plane swivels.

14. The apparatus of claim 11 wherein the club shaft is pivotally attached to the downswing plane.

15. The apparatus of claim 11 wherein the club shaft can rotate about its longitudinal axis to adjust or demonstrate club face orientation.

16. The apparatus of claim 11 further comprising a removable golf ball with a spin axis through the middle of the ball, and wherein a black line across the middle of the ball indicates spin direction perpendicular to the spin axis of the ball.

17. The apparatus of claim 11 wherein the target is a flag.

18. The apparatus of claim 17 wherein the base has a target line.

19. The apparatus of claim 11 wherein the base has a target line.

20. Apparatus for demonstrating how golf balls interact with golf clubs, comprising: a downswing plane; a club shaft attached to the downswing plane and having a path when moved in a direction; a golf club head attached to the club shaft and having a club face; a collision-plane indicator attached to the golf club head wherein the collision-plane indicator illustrates a plane created by two intersecting lines that are in the direction of the club path and the direction of the club face; a base having a target thereon; and a removable golf ball with a spin axis through the middle of the ball, wherein a black line across the middle of the ball indicates spin direction perpendicular to the spin axis of the ball, wherein the downswing plane has an adjustable angle, wherein the downswing plane swivels, wherein the club shaft is pivotally attached to the downswing plane, wherein the club shaft can rotate about its longitudinal axis to adjust or demonstrate club face orientation, wherein the target is a flag, and wherein the base has a target line.

* * * * *